May 9, 1933.  J. FLAWS, JR  1,907,532
MOUNT MAKING MACHINE
Filed Oct. 1, 1930   11 Sheets-Sheet 2
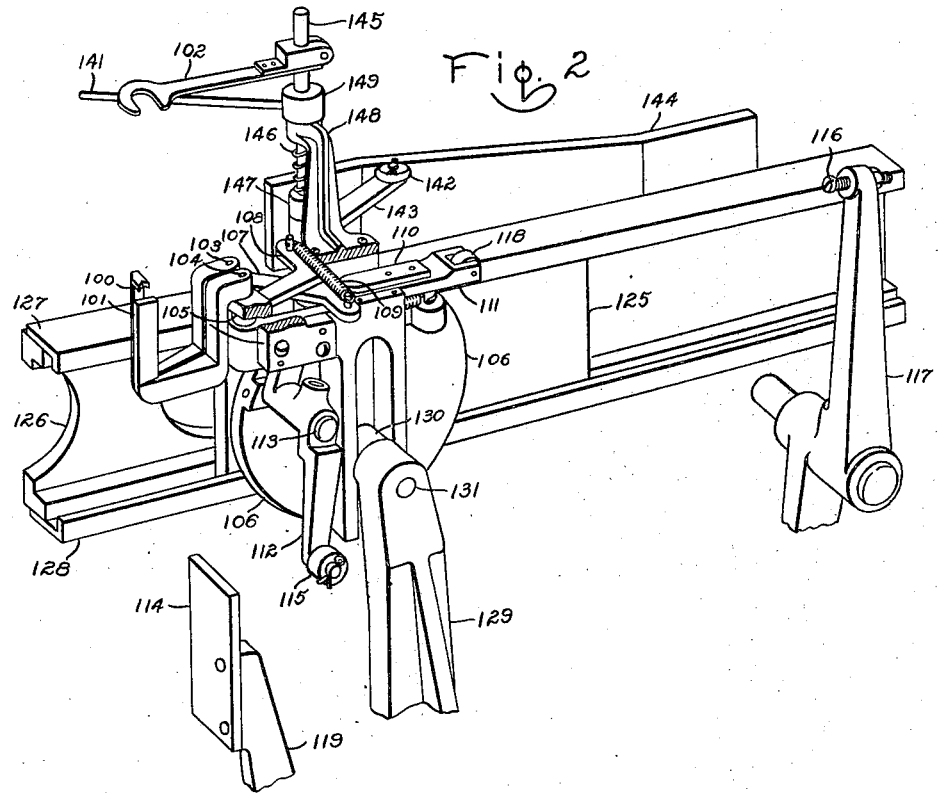
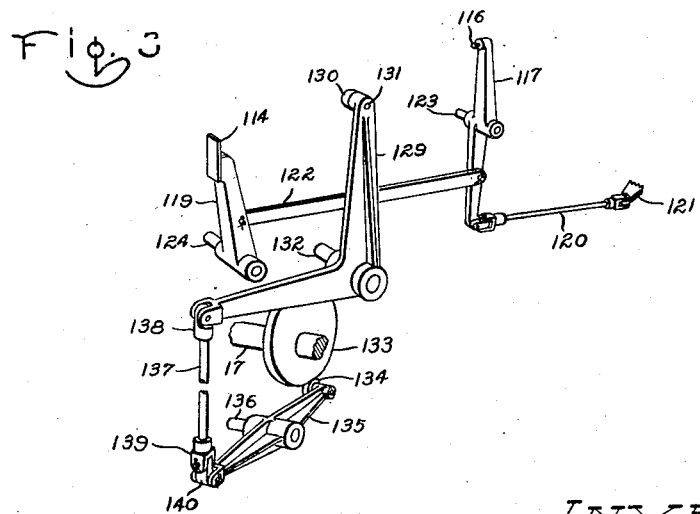
INVENTOR:
JOHN FLAWS, JR.,
BY Charles A. Mullen
His ATTORNEY.

May 9, 1933.　　　　J. FLAWS, JR　　　　1,907,532
MOUNT MAKING MACHINE
Filed Oct. 1, 1930　　　11 Sheets-Sheet 3
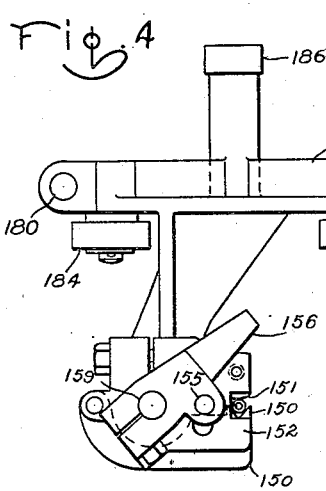
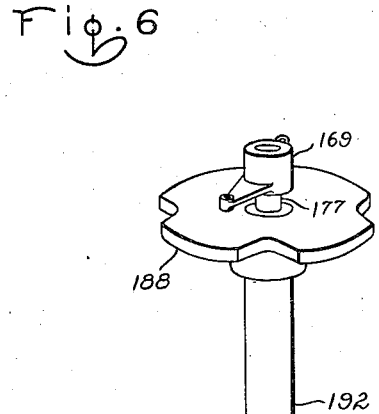
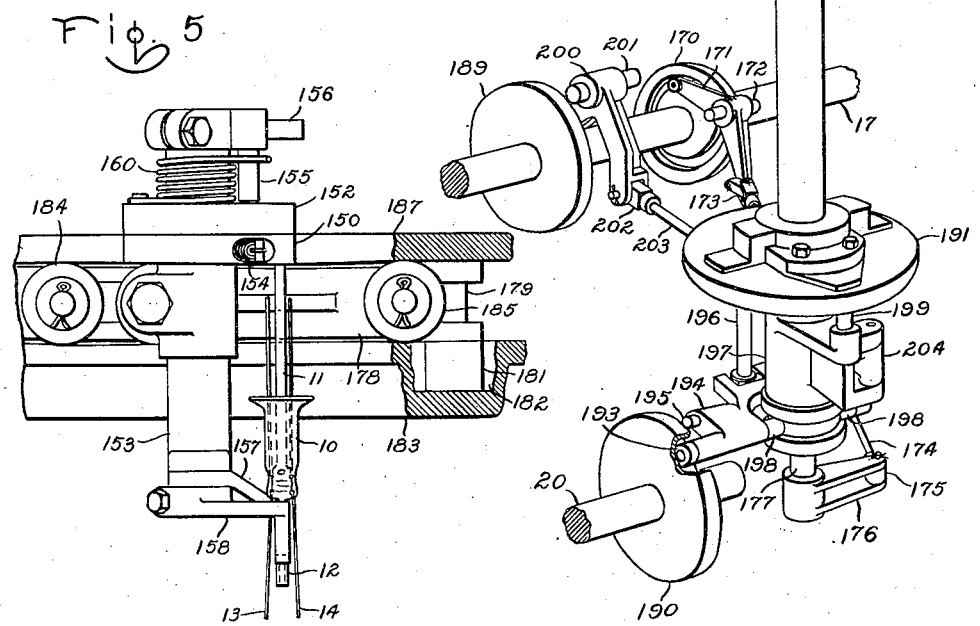
INVENTOR:
JOHN FLAWS, JR.
BY Charles W. Tullar
HIS ATTORNEY.

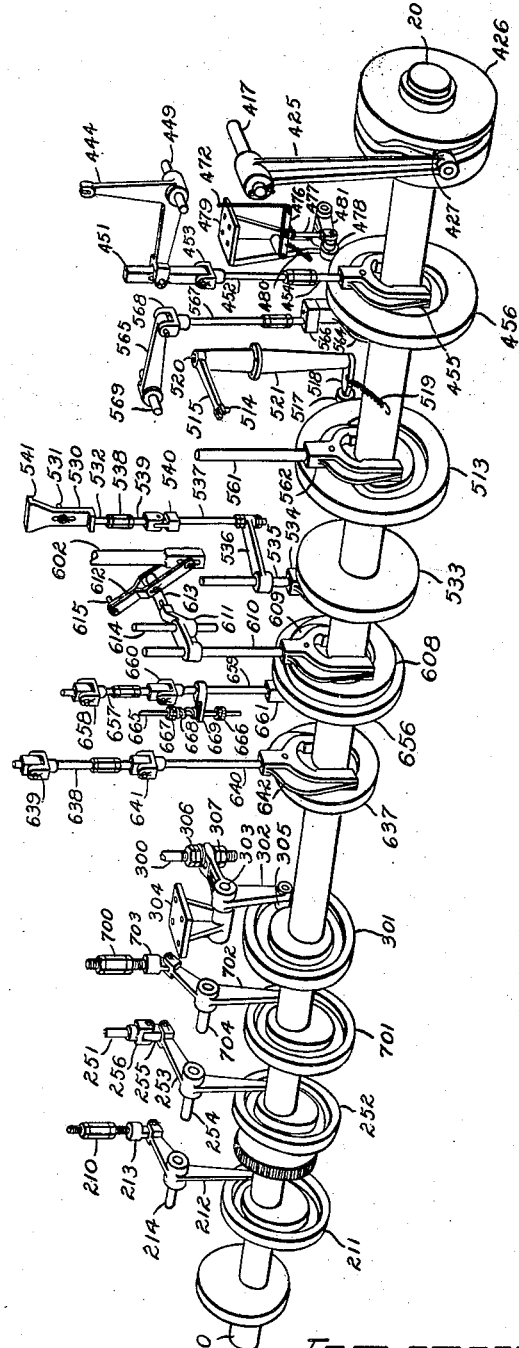

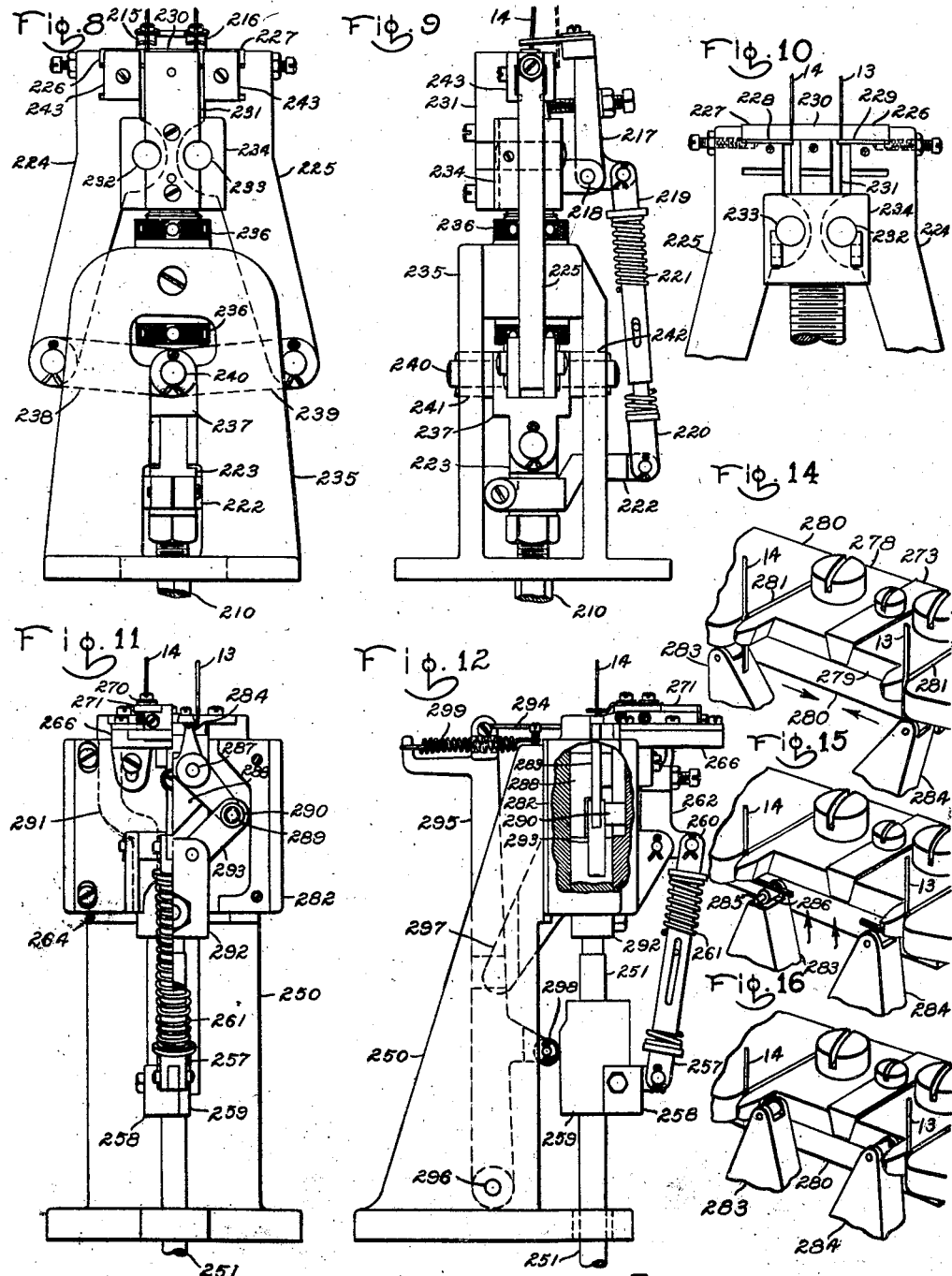

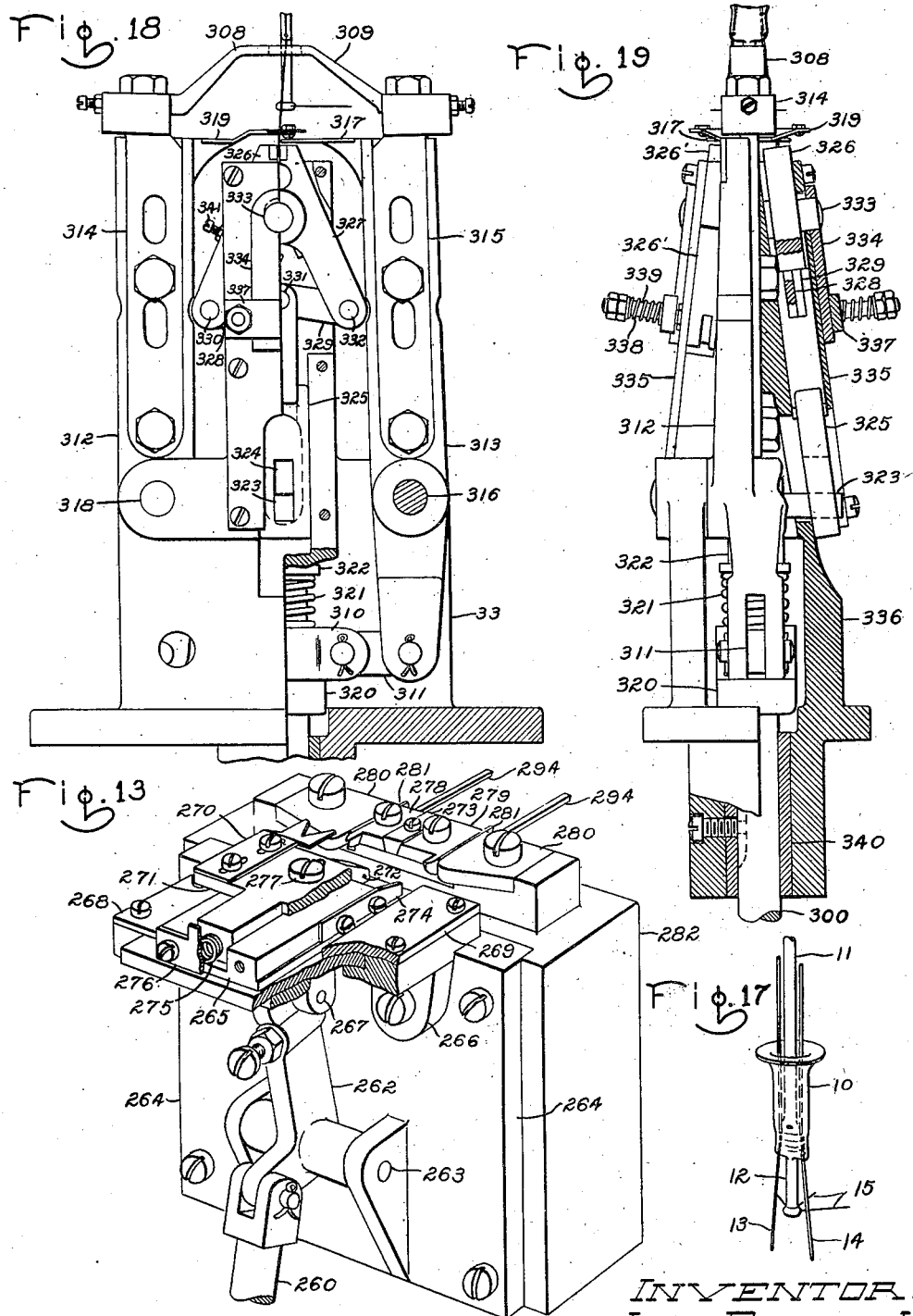

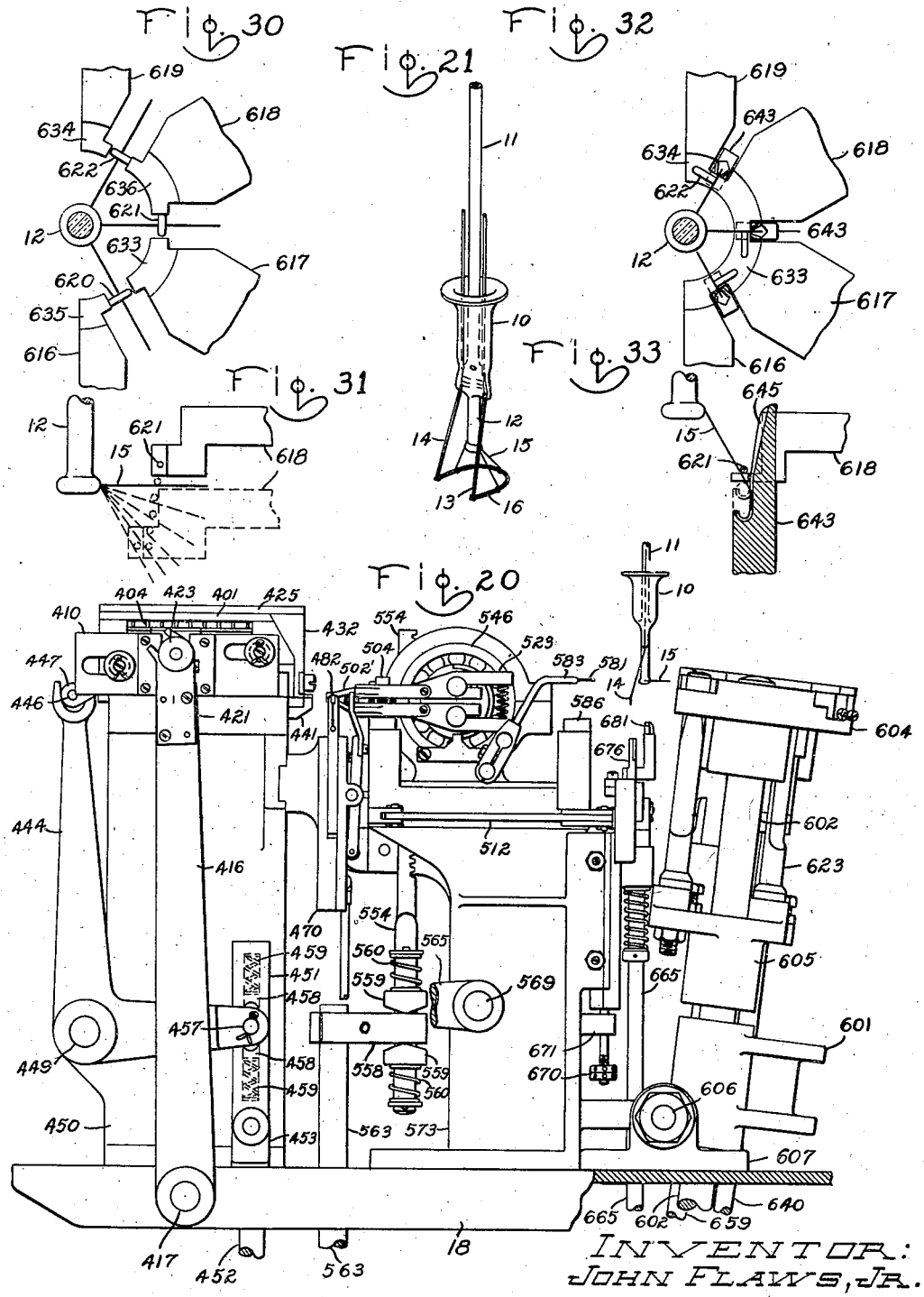

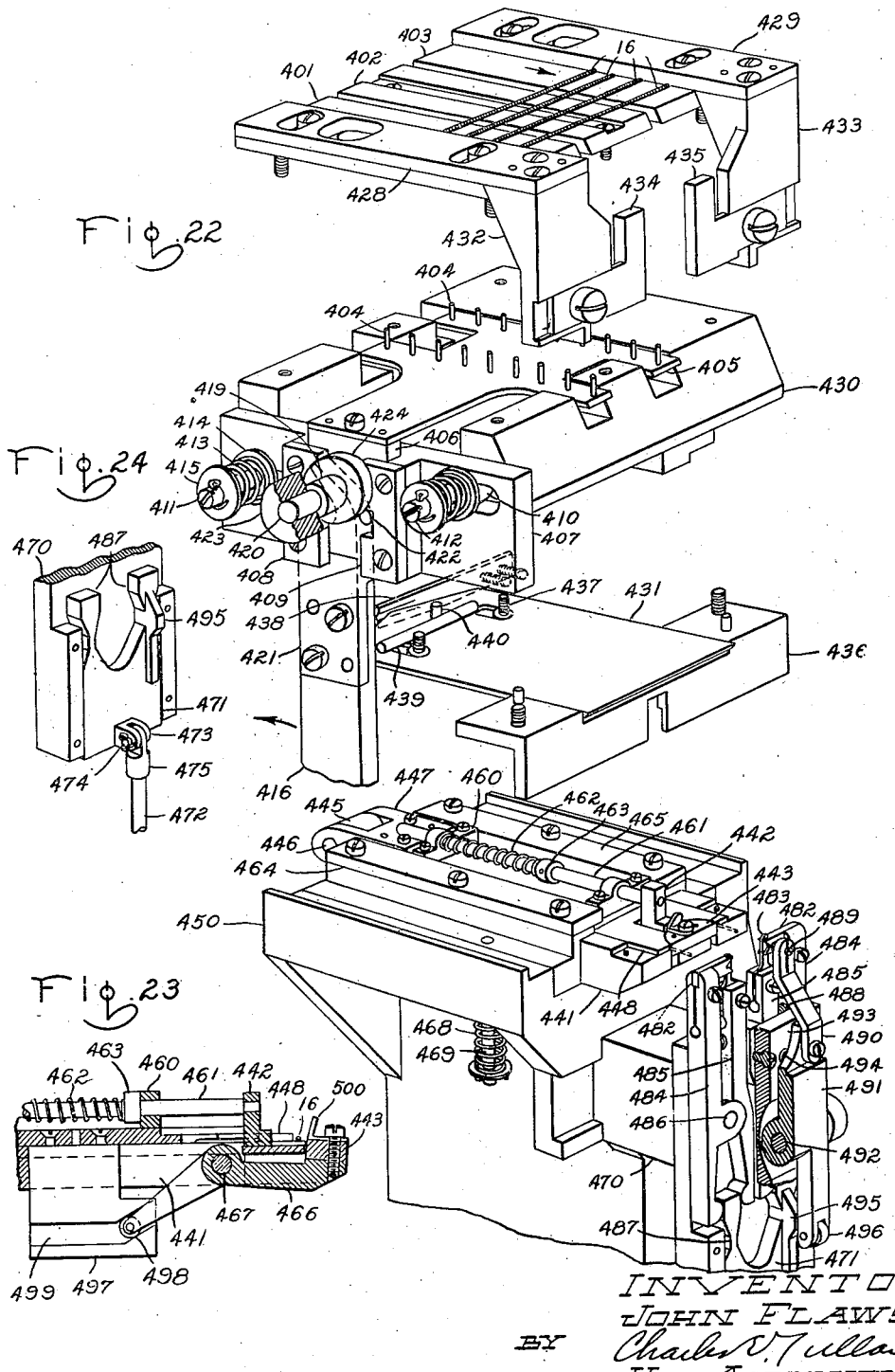

May 9, 1933.  J. FLAWS, JR  1,907,532

MOUNT MAKING MACHINE

Filed Oct. 1, 1930   11 Sheets-Sheet 9

INVENTOR:
JOHN FLAWS, JR.,
BY Charles V. Mullen
HIS ATTORNEY.

May 9, 1933.　　　　J. FLAWS, JR　　　　1,907,532
MOUNT MAKING MACHINE
Filed Oct. 1, 1930　　　11 Sheets-Sheet 10

INVENTOR:
JOHN FLAWS, JR.,
BY Charles W. Mullen
HIS ATTORNEY.

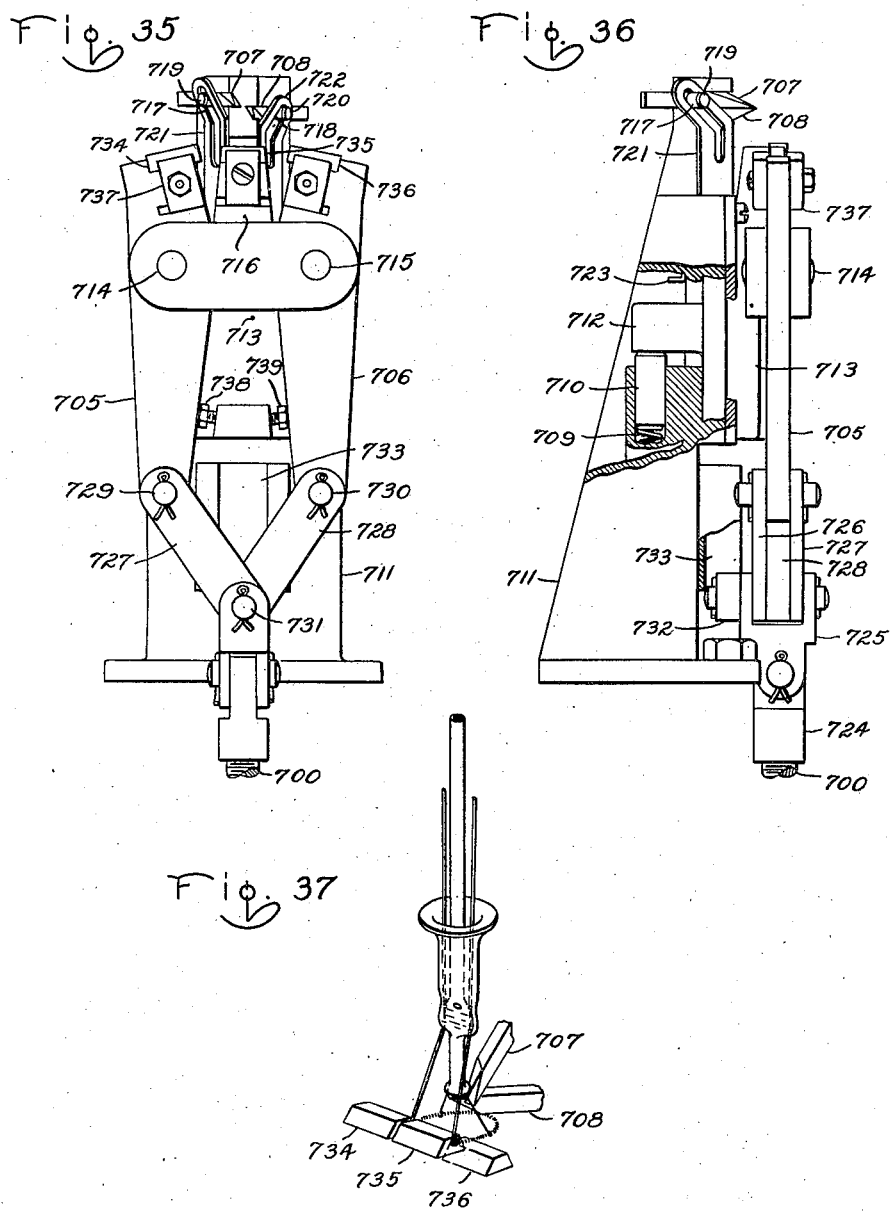

Patented May 9, 1933

1,907,532

UNITED STATES PATENT OFFICE

JOHN FLAWS, JR., OF CLEVELAND HEIGHTS, OHIO, ASSIGNOR TO GENERAL ELECTRIC COMPANY, A CORPORATION OF NEW YORK

MOUNT MAKING MACHINE

Application filed October 1, 1930. Serial No. 485,686.

My invention relates to apparatus for making filament mounts suitable for electric incandescent lamps and similar articles. More particularly, my invention relates to apparatus for automatically equipping a stem comprising a stem tube having leading-in wires sealed therein and protruding therefrom with a filament and necessary supports so as to constitute a complete mount. Although my invention is applicable to other types of stems, I have applied it specifically to the type disclosed in Mitchell and White Patent No. 1,423,956, which is usually made on machines such as disclosed in Fagan Patent No. 1,655,140. This application is a continuation in part of my application Serial No. 288,009, filed June 25, 1928.

The apparatus of my invention, more specifically, comprises automatic mechanism which trims the ends of the leading-in conductors, shapes them to receive the ends of the filament, positions said ends accurately specifically by stretching the said wires, then mounts a filament by causing its ends to engage the shaped and positioned ends of the leading-in wires, and then clamps said leading-in wire ends about said filament ends. Still more specifically, my apparatus comprises means for inserting anchor or filament support wires in a portion of the glass stem and during the mounting operation, these are curled around the filament to securely position it. Another feature of my invention is automatic means for feeding filament lengths to a preliminary filament forming and positioning mechanism from which they are successively transferred to the mounting position as the stems successively arrive to receive them. Additional features and advantages of my invention will appear from the following description of a species thereof and from the accompanying drawings.

Figure 1:
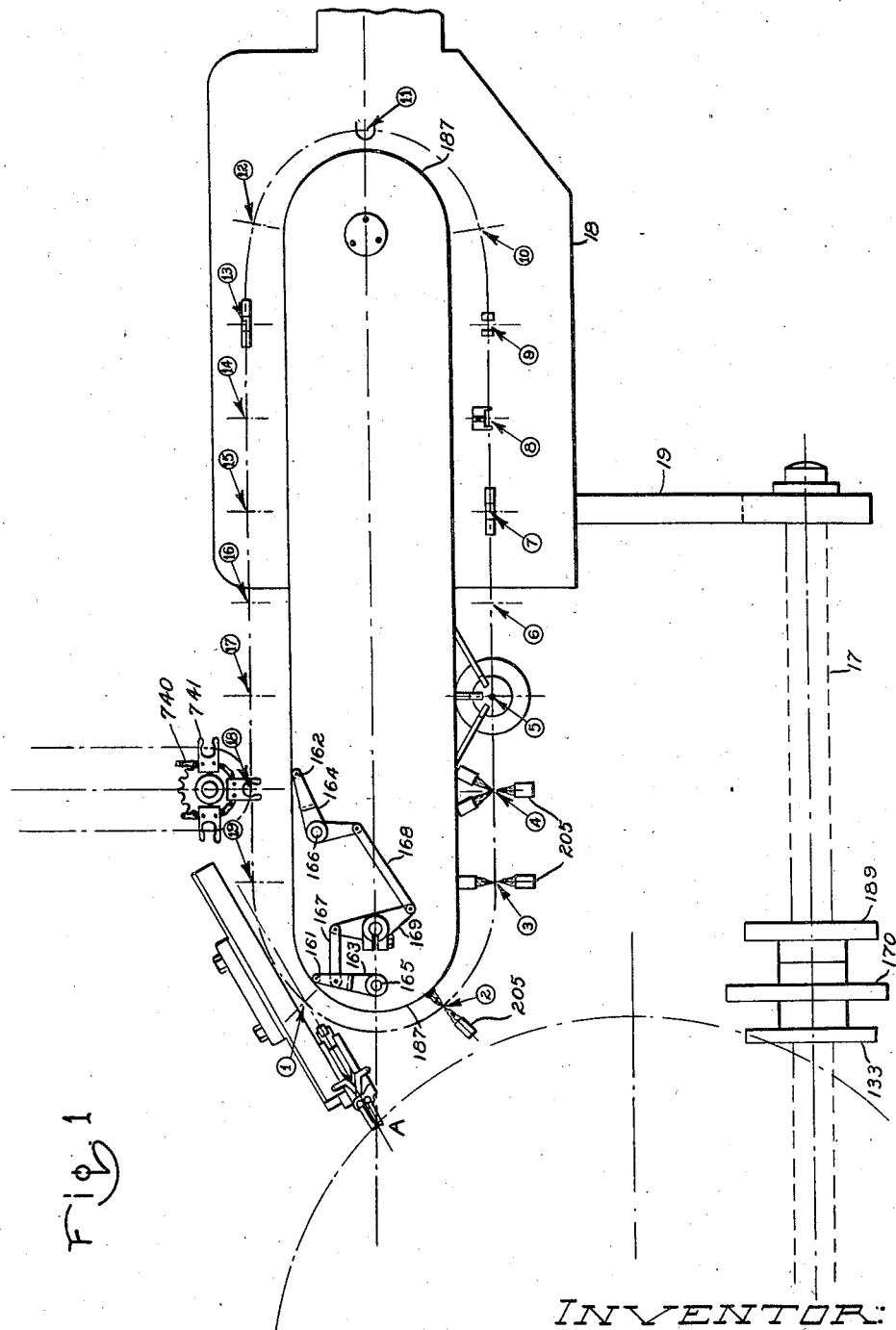
Figure 26:
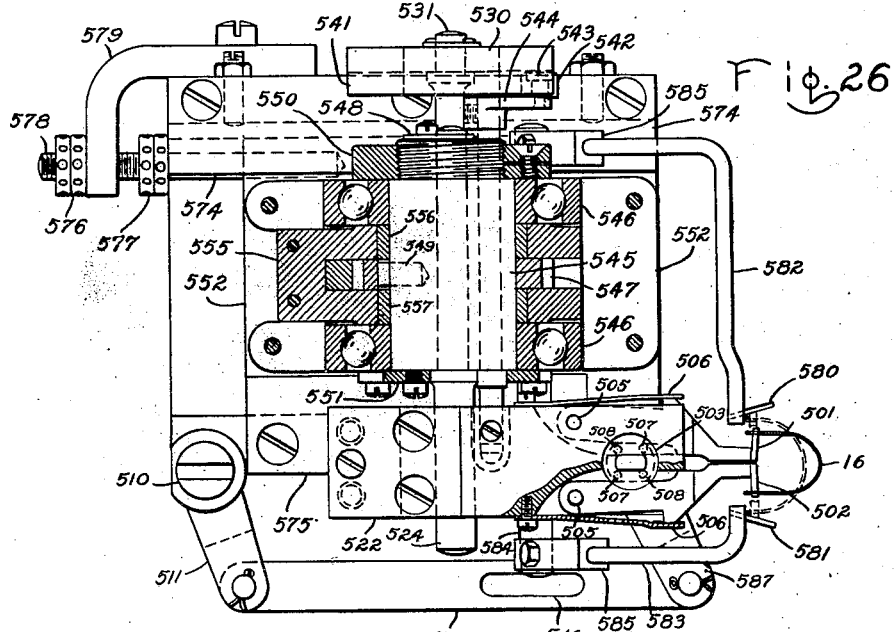
Figure 25:
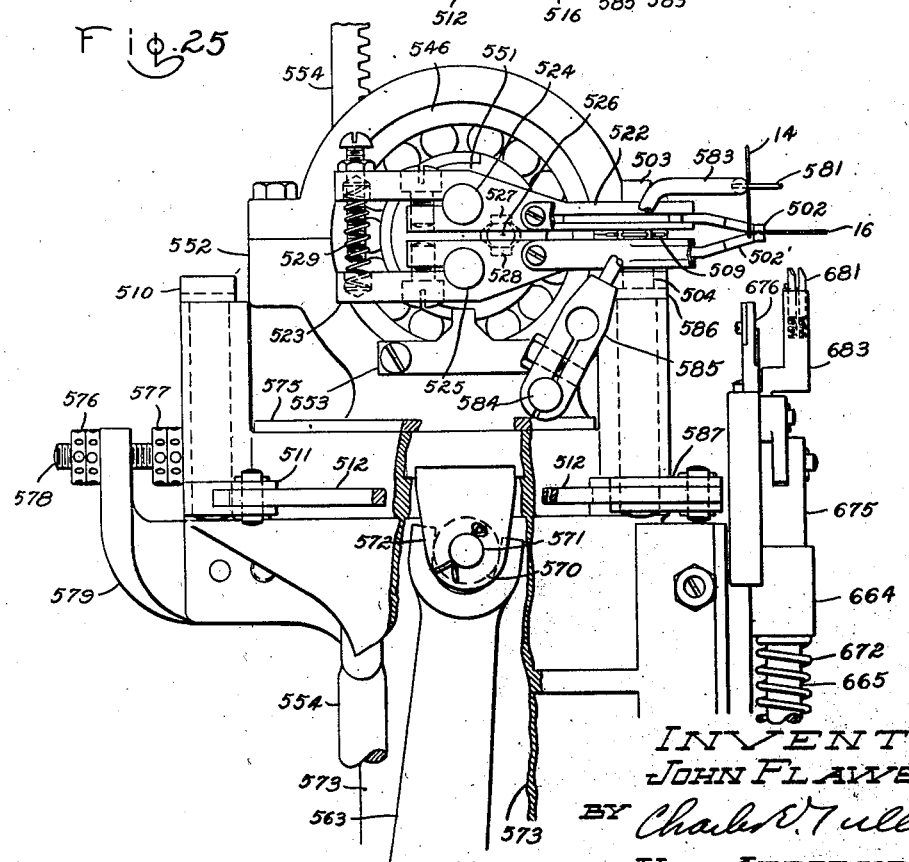
Figure 28:
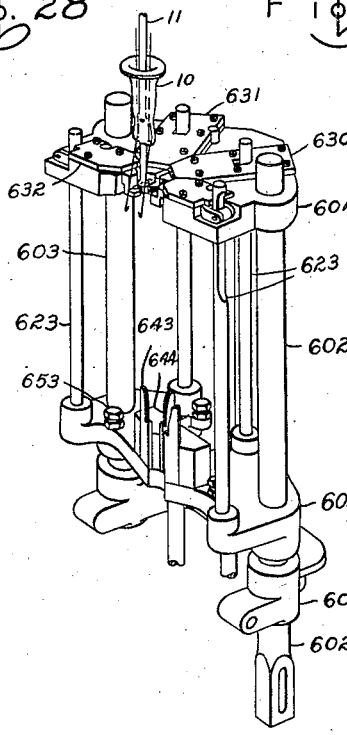
Figure 29:
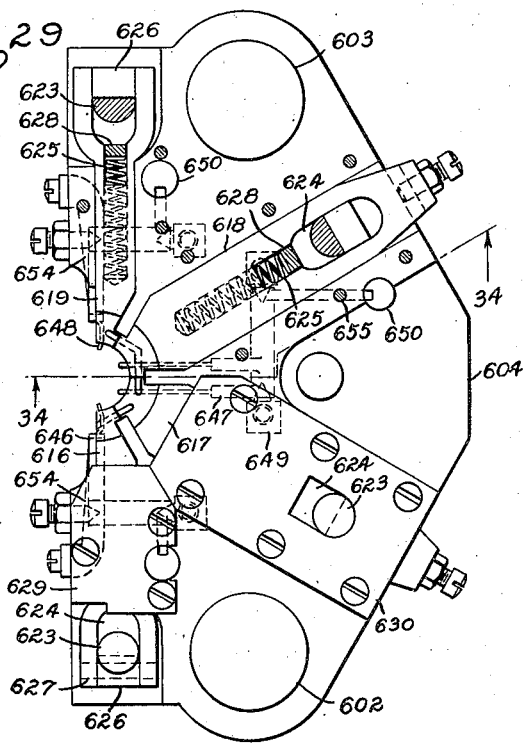
Figure 27:
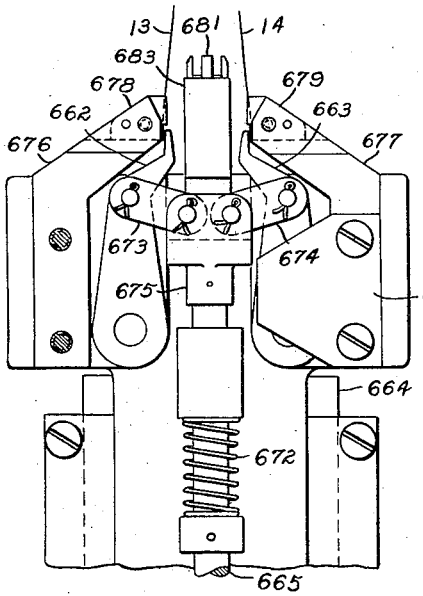
Figure 34:
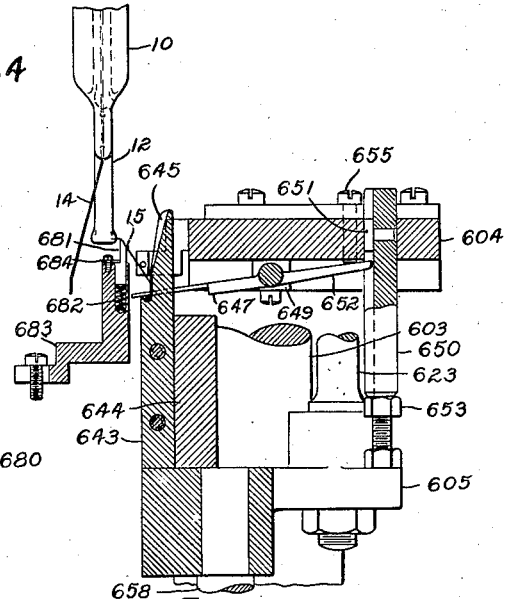

In the drawings, Fig. 1 is a schematic plan view of the machine of my invention; Fig. 2 is a perspective view of the stem transferring mechanism; Fig. 3 is a diagrammatic perspective view of the operating mechanism thereof; Fig. 4 is a plan view of a link of the stem conveying chain; Fig. 5 is a side elevation thereof; Fig. 6 is a perspective view of the operating means of said stem conveying chain; Fig. 7 is a diagrammatic perspective view of the various cams and operating levers of my machine which are located directly below the machine table; Fig. 8 is a front elevation of the leading-in wire trimming and flattening mechanism; Fig. 9 is a side elevation thereof; Fig. 10 is a fragmentary side elevation of the jaws of this mechanism; Fig. 11 is a front elevation partially in section of the leading-in wire hook-forming mechanism; Fig. 12 is a side elevation thereof; Fig. 13 is a perspective view of the head of this mechanism, Figs. 14, 15 and 16 are enlarged perspective views of the hook-forming parts of this mechanism in various stages of making the hook in the leading-in wires; Fig. 17 is a perspective view of the lamp stem as it appears at position 6; Fig. 18 is a front elevation partially in section of the leading-in wire setting mechanism; Fig. 19 is a side elevation thereof also partially in section; Fig. 20 is a side elevation of the filament mounting portion of my machine; Fig. 21 is a perspective view of the stem after being operated upon by all portions of my machine; Fig. 22 is an exploded perspective view of the filament feeding mechanism; Fig. 23 is a vertical section through the forming portion of this mechanism; Fig. 24 is a perspective view of the extreme lower portion of the mechanism shown in Fig. 22; Fig. 25 is a side elevation of the filament transferring mechanism; Fig. 26 is a plan view thereof partially in section; Fig. 27 is a front elevation of the preliminary leading-in wire hook-clamping mechanism; Fig. 28 is a perspective view of the mounting mechanism; Fig. 29 is a plan view thereof; Fig. 30 is a fragmentary plan view of the anchor support wire bending and clamping dies in their open position; Fig. 31 is a fragmentary elevation showing the operation of one of the dies; Fig. 32 is a fragmentary plan view of the anchor clamping dies in their closed position; Fig. 33 is a fragmentary sectional elevation showing the operation of one of the anchor wire curling dies; Fig. 34 is a vertical section through the mounting device along the line 34—34; Fig. 35 is a front elevation of the final leading-in wire hook-clamping and support wire positioning mechanism; Fig. 36 is a side elevation thereof; and Fig. 37 is a perspective view showing the principal parts of this mechanism operating upon the stem.

Referring now to the drawings, and more particularly to Fig. 1, a lamp stem is placed in a head of my machine at position 1 by my transferring mechanism which carries the stem from position A of the stem machine to position 1 of my machine. The stem as taken from the stem machine, as shown in Fig. 5, consists of the flare tube 10, the exhaust tube 11, the glass arbor 12 and the leading-in wires 13 and 14. The heads which support the stem in my machine are intermittently indexed and during their course of movement pass through 19 positions at which the stem carried by the said head is acted upon as follows: At position 1 the stem is received from the transferring mechanism. At positions 2, 3 and 4, the end of the arbor is heated. At position 5, the arbor button is formed and the support wires inserted. Position 6 is an idle position. At position 7 the inner portion of the leading-in wires are cut to length and the ends thereof flattened. At position 8 hooks are formed in the ends of the said inner leading-in wires. At position 9 the said wires are positioned by stretching. At position 11 the filament is fed, formed and mounted, and the anchor wires are positioned and their ends wrapped about the filament. Position 12 is an idle position. At position 13 the hooks in the ends of the leading-in wires supporting the filament are more tightly closed and the first and third anchor wires are again positioned. All the following positions are unoccupied except for position 18 which is occupied by a conveyor by which the stem is removed from the machine.

All portions of my machine are driven from cams either upon the extension of the stem machine's cam shaft 17 or upon a similar shaft (not shown) mounted directly below the table 18 of the machine. The latter shaft is driven from the stem machine's cam shaft by means of the link belt 19 which operates over a sprocket on either shaft.

The stem transferring means of my machine shown in Fig. 2 supports the stem by the arbor which is gripped by jaws 100 and 101 and by the flare which rests in the opening in the end of arm 102. The jaws 100 and 101 are fastened to pins 103 and 104 respectively which are supported by brackets 105 and 106 and which are operated by the actions of levers 107 and 108. The action of spring 109 provides the gripping action for the jaws, and wedge 110 counteracts this action while the jaws are open. The wedge acts upon two pins projecting from the under surface of levers 107 and 108 causing them to be spread and the jaws to be opened when the slide 111 on which the wedge is fastened is moved to the left. This action is produced at the stem machine position of the transferring mechanism of lever 112 which is turned about pin 113 in bracket 106 as plate 114 presses against roller 115, thereby causing the upper end of lever 112 which engages slide 111 to move the said slide the required distance to the left. At the position of the transferring mechanism before the mounting machine, the jaws are opened by pin 116 in the end of lever 117 which engages roller 118 in the end of said slide. The action of both lever 117, which supports pin 116, and lever 119, which supports plate 114 (Figs. 2 and 3), occurs as rod 120 is moved to the left by arm 121 which is a part of the head opening mechanism of the stem machine. These levers are operated together by bar 122 and operate about pins 123 and 124 respectively. As bracket 106 is bolted to slide 125 in the ways formed by channel 126 and plates 127 and 128, the oscillating motion of lever 129 will produce the necessary transferring motion in bracket 106. Lever 129 engages bracket 106 by means of roller 130 on pin 131 in the end of said lever which is operated about pin 132 indirectly by cam 133 upon stem machine cam shaft 17. The particular shape of cam 133 causes roller 134 riding over the face of said cam to operate lever 135 about pin 136 and to operate lever 129 through rod 137 and joint blocks 138, 139 and 140. The transfer motion produced thereby may be also used to change the vertical position of the stem as the angle which the slide is bolted to its supporting means (not shown) is adjustable. During the transferring motion, arm 102 which supports the upper part of the stem is swung back until the stem, if still supported by the arm, is pushed out of the arm by rod 141 and allowed to drop in a refuse box located below. Only a stem in which the arbor is disconnected from the flare tube will be carried over by the arm as all perfect stems will be supported by their arbor which is gripped by jaws 100 and 101. This action occurs as roller 142 in the end of arm 143 rides over the face of stationary cam 144 thereby turning shaft 145 to which arms 143 and 102 are attached. Spring 146 operating through collar 147 which is attached to shaft 145 and shaft supporting bracket 148, acts to keep roller 142 against the face of cam 144. Rod 141 is supported by collar 149 which is attached to bracket 148.

The stem is taken from the transferring mechanism by the head of the mounting machine shown in Figs. 4 and 5 which grips the exhaust tube 11 and the arbor 12, the latter just above the location occupied by the transferring jaws. The exhaust tube is gripped between jaw 150 and block 151 which is attached to the under surface of plate 152 mounted on stationary sleeve 153. Jaw 150 receives its closing energy from spring 154 which is stretched between a spring post in the jaw and one in plate 152. The jaw is opened by the action of post 155 which operates against the inner edge of the jaw through a slot in plate 152 and is attached to arm 156. Of the lower jaws which grip the arbor of the stem, jaw 157 is stationary and is attached to sleeve 153 while jaw 158 is movable and attached to shaft 159. The closing energy for this set of jaws is received from spring 160 which operates between a spring post in plate 152 and post 155 in arm 156 attached to the end of shaft 159. Both jaws are opened at both the loading position 1 (Fig 1) and the unloading position 18 by the engagement of arm 156 with pins 161 and 162 respectively. Each of these pins is held in similar brackets 163 and 164 which are operated about pins 165 and 166 respectively by links 167 and 168. These links are attached to lever 169 which is indirectly operated by cam 170 on the stem machine cam shaft 17 as shown in Fig. 6. As the cam is turned, lever 171 is turned upon pin 172 by the engagement of a roller in its end into the ways of the cam. This lever 171 connects to lever 169 through the universal joint 173, rod 174, joint 175, lever 176 and shaft 177. Each machine head is supported by a bracket 178 (Figs. 4 and 5) which is coupled to a like bracket ahead by pin 179 and one behind by pin 180. On the lower end of said pins is a roller 181 which like all other similar rollers of this bracket chain of nineteen sections, rides in slot 182 in track 183 whose general shape is shown in Fig. 1. These brackets are supported by rollers 184, 185 and 186 which ride between the upper section 187 and the lower section of the track and are propelled or indexed about their path by the notched wheel 188 (Fig. 6), the notches of which engage rollers 181. This mechanism is located under the left turn of the track and is operated from both cam 189 upon the stem machine cam shaft 17 and cam 190 upon the mounting machine cam shaft 20. The latter cam operates the locking and engaging mechanism which operates upon wheel 191 on shaft 192. Cam 190 acting through roller 193 tips lever 194 back and forth upon pin 195 thus pushing pin 196 into one of the four holes in the wheel 191, locking the mechanism in place, or pushing up bracket 197 by means of rollers 198 thereby engaging the feeding mechanism. When bracket 197 is in the up position, pin 199 held by said bracket is located in one of the holes in the wheel 191 and the mechanism is indexed by cam 189 which indirectly turns the bracket through 90°. Cam 189 is engaged by a roller in the end of lever 200 which is thereby operated about pin 201 and which operates bracket 197 through joint block 202, rod 203 and joint block 204. The machine heads are thereby supported, indexed and locked in position by the above described mechanism.

Now referring to Fig. 1, the mounting machine head is indexed through the next three positions, 2, 3 and 4, where the end of the arbor 12 is heated by burners 205. The end of the glass arbor is thereby softened and at the following position, 5, this end is formed into a button. While the button is still soft, other mechanism at this position inserts three support wires 15 in said button changing the stem construction to that shown in Fig. 17. Both the wires and the support wires inserting mechanism are of a design in common use and are not further described.

The stem is indexed to position 7 through position 6 which is an idle position to the leading-in wire flattening and trimming mechanism. This mechanism like all the other mechanisms of my invention which operate upon the mount portion of the stem, is located upon the upper surface of table 18 and is operated by one or more of the cams on cam shaft 20 (Fig. 7) mounted below the table. The flattening and trimming mechanism is shown in Figs. 8, 9 and 10 and consists primarily of toggle operated pliers which both flatten and trim the leading-in wires in a single operation. This mechanism is operated by rod 210 (Fig. 7) which in turn is operated from cam 211 by lever 212 and which is attached to said rod by joint block 213. A roller in the end of the lever engages said cam causing it to be turned about pin 214. The upward motion of the operating rod 210 causes the leading-in wires to be first pushed within the operating range of this mechanism, and to be then flattened and trimmed by the pliers. The locating means consists of the fingers 215 and 216 which engage the leading-in wires as the bracket 217 is turned upon the supporting pin 218 by the movement of the push rod. The upper part 219 of this rod is telescoped by the lower part 220 which operates the upper part by means of the spring 221 and which is operated by the bracket 222 fastened to the lower part 223 of the universal joint on the end of the operating rod 210. The flattening and trimming means consists of the pliers 224 and 225 with the hardened inserts 226 and 227 and the blades 228 and 229 which act in connection with the insert 230 in the bracket 231. The pliers 224 and 225 operate about the pins 232 and 233 respectively in the block 234 which also supports the bracket 231 and which is adjustably mounted in the mechanism standard 235 by means of its threaded portion and the nuts 236. A toggle joint transforms the motion of the upper section 237 of the universal joint on operating rod 210 to the levers 224 and 225 by means of the links 238 and 239. As pin 240 supports rollers 241 and 242 which operate in slots in standard 235, a corresponding movement will result in each plier with the vertical movement of the operating rod. The inserts 226 and 227 which are held in the ends of pliers 224 and 225 respectively by clamping blocks 243 on either side of them, may be used to merely grip the leading-in wires instead of flattening them.

The lower ends of the leading-in wires which have been preferably flattened and trimmed are now brought to my hook forming mechanism which is located at position 8 of the stem conveying means. This mechanism consists primarily of two fingers which wipe the ends of the leading-in wires about two hook-forming dies thereby forming the hooks in the leading-in wires by which the filament is attached. For convenience in describing, this device may be divided into three parts, the leading-in wire locating section, the hook forming section and the leading-in wire extracting section. Each of these sections depends upon the standard 250 for support and upon operating rod 251 for operation. Operating rod 251 is actuated by cam 252 (Fig. 7) which is engaged by a roller extending from one end of lever 253. This lever is operated about pin 254 and operates rod 251 through link 255 and yoke 256.

The operation of this mechanism occurs with the upward movement of the operating rod 251 which operates the locating section by means of a push rod. The lower part 257 of this rod is operated by the bracket 258 attached to cam 259 upon the operating rod 251, and the upper part 260 which is telescoped by the lower is operated by means of the spring 261 and operates lever 262. As shown in Fig. 13, this lever 262 swings from pin 263 supported by the cover plate 264 and operates slide 265 supported by bracket 266 by means of a roller (not shown) upon the pin 267. The slide 265 is kept in its ways within bracket 266 by means of the plates 268 and 269. As the upward movement of operating rod 251 carries slide 265 toward the hook forming dies, the slotted fingers 270 attached to sub-slide 271 will push the leading-in wires to a position before the hook forming dies, their limit of movement being governed by the nose 272 of the slide which strikes the wedge block 273. All further movement of slide 265 causes the narrow fingers 274 to push the leading-in wires to their final position between the dies as shown in Fig. 14. During this movement spring 275 confined behind plate 276 is compressed and bolt 277 by which the sub-slide is attached to slide 265 slides in a slot in the sub-slide.

In this position which is the position in which the leading-in wires are located when the hooks are formed, the ends of the leading-in wires are firmly held between the hook forming dies 278 and 279 and the raised ends of bracket 280, by the shims 281 and the narrow fingers 274 of the slide 265. The hook forming dies 278 and 279 and the wedge block 273 are supported in a depression of the bracket 280 on the head 282 of this mechanism which also encloses the fingers 283 and 284 and their operating mechanism. The fingers 283 and 284 (Fig. 15) have the pins 285 in their wiping ends which support the rollers 286 which in turn wipe the leading-in wires about the hook forming dies as the fingers pass through the various motions illustrated in Figs. 14, 15 and 16. These fingers operate about pins 287 (Fig. 11) in the slide 288 and are operated in the particular direction specified by the roller 289 on the pin 290 which engages slot 291 in the cover plate 264. The operating motion of the fingers is supplied by the slide block 292 which is operated by the operating rod 251 and which is connected to the fingers 283 and 284 by the links 293. Slide 288, to which the fingers are attached, rides freely in a vertical slot in the head 282 of this mechanism and moves only when the particular shape of the groove 291 directs the fingers in a vertical direction. The hook has now been formed and the return motion of the operating rod 251 is encountered which returns both the leading-in wire locating means and the hook forming means.

With the return of the operating rod 251, the effective movement of the extracting means is brought about. This mechanism consists of the two rods 294 which slide in slots just below the shims 281 and which are operated longitudinally by lever 295. This lever swings from the pin 296 in the support standard 250 of this mechanism and is guided by the extending portion 297 of the mechanism head 282. As the narrower part of the cam 259 upon the operating rod 251 is brought beneath roller 298 of this lever 295, the spring 299 will then be free to pull the lever toward the already formed hooks thus pushing them off the hook forming dies by the cooperation of rods 294.

The stem is now indexed to position 9 where the leading-in wires are accurately positioned in all directions by the leading-in wire setting mechanism shown in Figs. 18 and 19. This mechanism consists primarily of three sets of jaws, a single set of which grips the leading-in wires just below the stem press and two other sets each of which grips the end of a leading-in wire and pulls or stretches it just sufficiently to straighten and set it. The mechanism is operated by rod 300 which is operated by cam 301 (Fig. 7) in connection with lever 302. This lever is operated about pin 303 in bracket 304 extending from the lower surface of the machine table 18 by the engagement of roller 305 into the ways of cam 301 and operates rod 300 through the nuts 306 and 307. The stem is brought before this mechanism when the said rod is at its maximum upward position. As this operating rod 300 starts down, the leading-in wire holding jaws 308 and 309 are closed by the straightening out of the toggle joint formed by the yoke 310, the links 311 and levers 312 and 313 to which the jaw holding arms 314 and 315 are fastened. Lever 313 as it is turned upon pin 316 also brings locating strip 317 against the leading-in wires while lever 314 operating about pin 318 brings the slotted locating strip 319 against the leading-in wires thereby positioning the said wires by locating them within the slots in strip 319. As yoke 310 is now unable to follow collar 320 which is fastened to operating rod 300, the continued motion of the rod is taken up by spring 321. Attached to the end of said rod is the block 322 which bears against the spring 321 and which connects to each setting jaw mechanism through the bar 323. Each of these mechanisms is alike and does not operate during the foremost movement of the operating rod 300 as the bar 323 moves in the slot 324 in the slide 325. Further movement closes the jaws 326—327 and 326'—327' as the slides 325 are then moved down. Slides 325 operate these jaws through the toggle joint formed between the slide and the jaws by the links 328 and 329 which operate upon the pins 330—331 and 331—332 respectively. Further downward movement of the operating rod after the leading-in wires have been gripped by the jaws causes the complete jaw assembly including the pins 333 about which they operate and the strips 334 by which the pins are held to move down a short distance thus stretching the leading-in wires. This latter strip 334 is free to operate nearly vertically between the cover plate 335 of the device standard 336 and the friction strip 337 which is held against it by the pressure of springs 338 on the bolts 339. The device standard 336 also supports the bushing 340 through which the operating rod 300 moves. With the return movement of this rod, each set of leading-in wire setting jaws will be opened to their limit as governed by the screws 341 before the jaws will again be raised to their upper position.

The stem is now indexed to position 10 and then to position 11 which is occupied by the filament mounting portion of my machine. The filament mounting portion of my machine which is shown in Fig. 20 is made up of three mechanisms: first, the filament feeding mechanism; second, the filament transferring mechanism; and third, the filament mounting mechanism. The filament coil completely prepared for mounting is placed manually in the feeding mechanism which positions and forms it. From this mechanism the filament is transferred to a position adjacent the lamp stem on which it is mounted by the mounting mechanism while still supported by the transferring mechanism. The finished stem from this mechanism is shown in Fig. 21. Each mechanism, like all the previously described mechanisms, is operated by the arrangement of cams and levers shown in Fig. 7.

The length 16 of filament coil is placed by an operator across the plates 401, 402 and 403, as shown in Fig. 22. The filament is fed along the plates in the direction indicated, by the pegs 404 which operate in the openings between the plates. The pegs are located in the plate 405 in pairs which, by their method of operating, move a filament forward to the position just vacated by the preceding pair, which, by their duplicate motion, repeat the process, thus eventually feeding the filament across the plates. The plate 405 is fastened to the slide 406 which operates in the ways in bracket 407 in which said slide is held by the plates 408 and 409. The bracket 407 is supported on the rollers 410 of the pins 411 and 412 and is retarded from operating on the rollers 410 by the slight frictional action produced by the springs 413 in connection with the washers 414 and 415. The operation of this feeding portion of the mechanism occurs with the turning of lever 416 about a pin 417 (Fig. 20) in the side of the table 18. With the swinging of the lever to the right, which produces the feeding motion in the pegs 404, the plate 405 will be raised to bring the pins up into the plane of the filaments and then moved to the right to push the filament forward. The raising occurs as roller 419 upon pin 420 rolls up the slot in the extension 421 of the lever 416 and ends when pin 422 in slide 406 strikes the end of the opening in plate 409. As the lever 416 continues to move, the bracket 407 will be pushed to the right to the position shown in Fig. 22. Each of the filaments have now been fed a certain distance along the plates 401, 402 and 403 and lever 416 is swung back before repeating the feeding movement. The return movement of the lever causes the pins to drop as the roller 419 will roll down the slot in the lever extension 421 and then carries the pins back to their starting position as the bracket will be moved to the left. The lever extension operates between the collar 423 and the flange 424 of pin 420. The operation of lever 416 occurs as pin 417 is turned by lever 425 (Fig. 7) which is operated by cam 426 through the engagement of roller 427 with the ways of said cam. During the travel of the filament thus far, it has been guided by the plates 428 and 429 and as it slides down the face of the mechanism body 430 on to the gate 431, it will be kept in place longitudinally by the blocks 432 and 433 and the arms 434 and 435. The forward portion of the gate 431 is supported by the yoke 436 and the remaining portion by the screws 437. The spring 438 which is fastened to the mechanism body 430 keeps the gate forward at all times except when the gate is opened by the pin 439 which strikes the pin 440 when the bracket 407 in which pin 439 is mounted is moved to the left.

The filament 16 drops the gate on to the slide 441 at the position shown in Fig. 23 and is then located in the forming portion of this mechanism. Immediately after the filament has ceased to twitch, the block 442 moves forward clamping the said filament against the semi-circular die 443. This motion is caused by lever 444 (Fig. 20) which operates against roller 445 on pin 446 of the bracket 447 and is at this point in the operating cycle moving forward the sub-slide 448 to which bracket 447 is attached. The lever 444 is turned about pin 449 in the mechanism standard 450 by the link 451 which in turn is operated vertically by the rod 452 in connection with the yoke 453. This rod 452 is attached to the turn buckle (Fig. 7) which in turn is attached to rod 454 extending from the yoke 455 and is operated as the irregularities in the ways of cam 456 cause a roller (not shown) in these ways to move the yoke vertically. The motion produced in the link 451 is transferred to the lever 444 by the pin 457 which operates in a slot in the said link and which engages blocks 458 backed by springs 459. The motion of the sub-slide 448 is conferred to the block 442 by one of the brackets 460 which connects to the rod 461 to which the bracket is attached by means of the spring 462 and the collar 463. As the sub-slide 448 is moved forward until it is against the die 443, the filament will be formed to the shape of the said die. In this position the filament will be confined, except for its ends, in a recess in the sub-slide as shown in Fig. 22. The continuing movement of the operating lever will cause the slide 441 in which the sub-slide 448 is held by the plates 464 and 465 to be slid a short distance forward as the sub-slide is butting against the die 443 on lever 466 of pin 467 in the said slide 441. The two pins 468 (only one being shown) which hold the slide in the standard 450 with the assistance of springs 469 operate in slots in the standard during the motion of the slide.

The ends of the filament protruding from sub-slide 448 are now positioned by another portion of this mechanism. As each end of the filament is acted upon by duplicate parts, this portion of the mechanism will be described only in connection with one end of the filament. The complete device is supported by bracket 470 and is operated by vertical motion of slide cam 471 shown in Fig. 24 as well as in Fig. 22. At this point in the operation of the mechanism, the cam 471 is lowered by rod 472 in connection with yoke 473, pin 474 and link 475. The action occurs as lever 476 (Fig. 7) is lowered by the action of rod 477 which is moved vertically by roller 478 which in turn rides upon the face of cam 456. The lever 476 operates about a pin in the bracket 479 attached to the under surface of the machine table and is constantly pulled down by spring 480 causing said roller 478 to be kept against the face of the cam. Roller 478 swings from a pin in the end of lever 481 supported from a pin in the end of bracket 479. The lowering of the cam 471 (Fig. 22) causes the filament to be positioned in every direction in a vertical plane by guide block 482 and the finger 483 which are brought together by the turning of levers 484 and 485 respectively on pin 486. This action results from the wider portion of the leg 487 of the slide cam 471 which is now located between the lower portion of levers 484 and 485 and is produced against the action of spring 488. The filament is further positioned by the cam 471 which indirectly brings the flared-out portion of screw 489 against the end of the filament. This screw 489 is located in the end of arm 490 of lever 491 which is turned about on pin 492 in the cover plate 493 of this device against the action of spring 494 by the thicker portion 495 of the cam which is now located below roller 496 in the end of said lever. As the transfer jaws grip the filament on the loop side of the filament, just inside the positioning fingers, as shown in Fig. 20, a definitely known length of the filament will be later squeezed in the leading-in wire hooks. After the transfer jaws have gripped the filament, the positioning and the forming devices return to their rest or open position. The return motion of the forming mechanism is not the reverse of the forming motion as sub-slide 448 travels to the left until cam 497 strikes slide 441, whereupon both the slide and the sub-slide are returned to the rest position. During the separate motion of the sub-slide 448, the forming die 443 is lowered by the lever 466 as the roller 498 engages the raised portion of the slot 499 in the cam. The filament will thereby be allowed an unobstructed passage over the forming die 443 which also supports the guide 500.

The transferring mechanism of this machine carries the filament from the feeding mechanism just described to the mounting position 11 where the said mechanism also supports the filament during the mounting operation. In Figs. 25 and 26 where the transferring mechanism is shown, the mechanism is half through the cycle of operation and should be turned back bringing all parts now off center to the right, over to the left an equal distance off center, as shown in Fig. 20. One end of the filament is gripped by jaws 501 and 501' and the other by jaws 502 and 502' after the pairs of jaws have spread from their position as shown in full lines in Fig. 26 to their spread position as shown by the dotted lines. The jaws are spread by the cams 503 and 504 which turn the jaws about pins 505 against the action of springs 506 and which are operated in connection with each other by a pair of pins 507 in one and another pair 508 in the other which are engaged by the plate 509. The flat portion of cam 503 enters into a slot in the end of pin 510 which is turned by lever 511 which in turn is operated like another similar mechanism at the other position of the jaws by the rod 512. This portion of the mechanism is operated by the outer face of cam 513 (Fig. 7) which indirectly causes pin 514 in the end of arm 515 to operate in the slot 516 in rod 512 thus operating the machine. Roller 517 which is supported on arm 518 is held against the face of the cam by the action of spring 519 and acts through this arm 518 to turn shaft 520 to which arm 515 is attached. This operating mechanism is held by the support 521 which passes through an opening in the table top and is attached thereto. The upper set of jaws 501 and 502 which are held in lever 522 and the lower set of jaws 501' and 502' which are held in lever 523, are operated about the spindles 524 and 525 respectively by the cam 526. This cam operates against the hardened inserts 527 and 528 in these levers against the action of spring 529 in the other ends of these levers. Slide 530 which is operated vertically on the pin 531 by rod 532 (Fig. 7) is indirectly operated by cam 533. A roller (not shown) in the ways of the said cam operates yoke 534 vertically thereby moving rod 535 which is attached to the yoke, arm 536 which is attached to rod 535 and rod 537 which is attached to the arm. This rod 537 operates rod 532 through the turn-buckle 538, rod 539 and the joint 540 thereby controlling the opening and closing of the jaws. The flange 541 of the slide engages roller 542 on pin 543 in the lever 544 on the end of said cam 526. The jaws have, by the above mechanism, been opened, spread apart, closed upon the filament, moved together again, and now the complete jaw assembly is turned and moved to the right, thereby transferring the filament. The cam 526 and the supporting spindles 524 and 525 are supported by the cylinder 545 which rides in the ball bearings 546 and which is operated by the gear 547. The spindles are held in the cylinder by the collar 548 which rides in a slot cut around the end of each spindle and the gear 547 is attached to the cylinder by the pin 549 which engages a slot cut in said gear. The lock nut 550 and washer 551 hold the cylinder in place against the ball bearings 546 in the bracket 552 which carries stop 553 which in turn engages the washer in limiting the rotation of the cylinder to 180°. To keep rack 554 engaged with gear 547 to enable the vertical motion of the rack to rotate the cylinder assembly, the yoke 555 which rides upon the bushings 556 and 557 is employed. The turning occurs as the rack is raised and precedes the time when the entire assembly is moved to the right. The mechanism is only turned through approximately 178° at this time but completes the full 180° of movement after the assembly has been moved to the right and the jaws spread, thus lowering the ends of the filament into the open hooks in the leading-in wires after the ends of the filament have been positioned. Means for rotating this mechanism is provided by arm 558 (Fig. 20) which operates rack 554 through blocks 559 and springs 560, and which is operated by cam 513 (Fig. 7) through rod 561 and yoke 562. Means for moving this mechanism horizontally is provided by lever 563 which is operated indirectly by cam 456. Yoke 564 upon the opposite face of cam 456 from yoke 455 is operated through a roller (not shown) in the ways of said cam and operates lever 565 through lock 566, rod 567 and yoke 568. Lever 565 is supported on spindle 569 which also supports lever 563 (Fig. 25) thereby providing complete operating means to this lever 563. This lever engages roller 570 on pin 571 in the yoke 572 projecting from the base of bracket 552 and now slides the bracket which is held in the standard 573 by the plates 574 and 575, to the right. The extent of the movement is controlled by the nuts 576 and 577 on the rod 578 in the bracket which engages arm 579 extending from the mechanism standard. The movement to the right places all parts of this mechanism in the position shown in Figs. 25 and 26 and also locates the leading-in wires of the stem. The leading-in wires are engaged by the pins 580 and 581 in the arms 582 and 583 respectively which are supported from rod 584 in the bracket 552 by the clamping blocks 585. After the leading-in wires have been located, as just described, the jaws are spread, positioning the ends of the filament just above the open hooks in the ends of the leading-in wires. The spreading of the jaws occurs as cam 504 is turned by the mechanism consisting of the pin 586 and the lever 587 which engages rod 512 like the similar mechanism at the other position of the jaws. The filament is now lowered into the hooks as the jaws complete this full 180° of movement. All further operation of this mechanism is completed after the filament has been mounted by that particular portion of my machine. The final movements of this mechanism consist of the opening and moving together of the jaws and the return transferring motions.

That portion of the filament mounting apparatus for locating and bending the anchor support wires 15 and then curling their ends about a coiled filament placed adjacent thereto is carried in a bracket 601 located below the stem 10 and, as shown in Figs. 20 and 28, comprises a pair of upwardly extending rods 602 and 603 having slidably mounted thereon upper and lower platforms 604 and 605 respectively. The bracket 601 is mounted on a pivot 606 carried in a standard 607 extending from the base 18 of the apparatus and normally lies out of the path of travel of the stems. When a stem has been conveyed to its proper position before the mounting mechanism, the bracket is rotated about its pivot thus bringing the various devices carried thereby into proper working alignment with the lower portion of the stem. The rotation of the bracket is accomplished by a cam 608 (Fig. 7) whose shape is such as to swing the lower end of rod 602 thereby causing the bracket 601 to rotate about its pivot 606 placing the upper platform 604 in a position where it partially surrounds the lower portion of the lamp stem with the lower platform 605 directly below it. The cam motion is transferred to the rod 602 as shown in Fig. 7, by the yoke 609 which carries a roller (not shown) located in the ways of the cam and which operates rod 610. The motion of rod 610 is taken by the arm 611 to which the rod is attached and operates lever 612 by means of the link 613. Rod 610 is guided by the machine table and rod 614 which is fastened to the said table acts as a guide for the arm 611. The resulting motion in lever 612 turns it upon pin 615 protruding from the table of the machine and causes the roller in the opposite end of said lever to manipulate rod 602.

After the bracket 601 has been rotated to the working position, the first operation is to bend downwardly the anchor support wires so as to place them in a position where they may be conveniently engaged by dies which loop them around a coiled filament later placed adjacent to them. This bending operation is accomplished by a plurality of bending and clamping dies comprising the plates 616, 617, 618 and 619 slidably mounted in the upper platform 604. As shown in Figs. 30 and 32, the plate 616 carries a pin 620 which extends over and at right angles to one of the anchor support wires 15 and the plate 618 carries the oppositely disposed pins 621 and 622 which extend over and at right angles to the remaining anchor support wires 15. The plates are held away from each other by means of the cam rods 623 carried by the lower platform 605. These cam rods extend upwardly through openings 624 in the plates and force the said plates backwardly against the action of springs 625 (Fig. 29) through the rollers 626 on pins 627. The springs are confined in wells in each of the plates and operate against tongues 628 protruding from the lower surface of plates 629, 630, 631 and 632 which also confine the said plates in their ways in the lower platform 605. As the bracket comes into position the plates are in their open position and the pins 620, 621 and 622 are located somewhat above the anchor support wires as shown in Figs. 30 and 31. In starting, the upper platform is moved downwardly at which time the bending pins contact with their respective anchor support wires carrying them downwardly and inwardly toward the center of the stem, their path of travel being shown in dotted lines in Fig. 31. During the downward travel of the upper platform 604, the plates are forced inwardly toward each other by the springs 625 which cause the rollers 626 to ride upon the inclined cam surfaces of the cam rods 623. When the upper platform has reached the limit of its downward travel, the rollers 626 are on the low point of the cam rods and the inner face of each plate is in contact with that of the adjacent plate thereby clamping an intermediate portion of an anchor support wire between them as shown in Figs. 32 and 33. The inner portions 633 and 634 of the plates 617 and 619 are thinner than the portions 635 and 636 of the pin carrying plates 616 and 618 so as to allow the pins to ride over the shallow sections on their downward travel. This thickness may be compared by referring to Figs. 31 and 33. The lowering and raising of the upper platform is accomplished by cam 637 (Fig. 7) which operates the connecting rod 638 pivotally attached to the said platform by the joint 639 and to the operating rod 640 by the joint 641. The lower rod 640 is attached to yoke 642 whose roller rides in the ways of the cam 637.

The anchor support wires 15 being located and properly positioned as shown in Figs. 31, 32 and 33, the next step is to place the filament coil in the open hooks of the leads 13 and 14 and adjacent to the lower portions of the said anchor supports. This is accomplished automatically by the filament coil transferring mechanism as previously described. When the filament has arrived at the mounting position, the next step is to curl the ends of the anchor support wires around the filament and this is accomplished by a series of dies 643 which are adapted to simultaneously engage the lower ends of the support wires and curl or wrap them about the filament coil. The dies 643 are carried on block 644 in the lower platform 605 and mounted so as to be in accurate alignment with the lower ends of the anchor support wires which contact with the grooved portions 645 of the said dies during the upward movement of the lower platform. The continued upward movement of the platform causes the anchor support wires to follow the grooves 645 whose paths are semi-circular at their lower ends causing the said wires to curl around the filament coil as shown in Figs. 33 and 34. When the anchor wires have been but half curled, as shown in Figs. 34, the weights 646, 647 and 648 (Fig. 29) drop upon the filament, pushing it into the half formed coil. These weights are held on the tapered points of blocks 649 and are normally held in their raised position by the weight of rods 650. In this position the key 651 of rod 650 is engaging the extending end 652 of the weight. The weights drop as bolts 653 raise rods 650 but only to the extent limited by the fingers 654 and the screw 655. The raising and lowering of the lower platform 605 is accomplished by cam 656 (Fig. 7) which reciprocates the connecting rod 657 pivotally connected by the joint 658 to the bottom of the said platform and to the operating rod 659 by the joint 660. The lower rod 659 is attached to the yoke 661 whose roller rides in the ways of the cam 656.

The open hooks of the leads are closed about the ends of the filament coil by a clamping device which is raised into position adjacent the said hooks. As shown in Figs. 20, 25 and 27, the clamping device comprises the jaws 662 and 663 pivotally mounted on a slide 664 which in turn is slidably mounted in the standard 573. The clamping device is moved upwardly simultaneously with the lower platform 605 by the rod 665 which is operated (Fig. 7) through nuts 666—667 and spring 668 by the yoke 669 attached to the lower platform operating rod 659. When the jaws 662 and 663 have reached their proper position adjacent the open hooks of the leads, an adjustable stop 670 (Fig. 20) carried by the slide 664 contacts with a stationary lug 671 thereby halting the upward movement of the said slide, but the rod 665 continues to move upwardly against the action of a spring 672 causing the jaws to rotate about their pivots through links 673 and 674 which are connected to block 675 carried on the end of said rod and to the said jaws. The jaws then contact with the hooks and force their open ends against the stationary jaws 676 and 677 thereby closing them about the ends of the filament coil. The inserts 678 and 679 in the ends of the stationary jaws enable these surfaces to be replaced and the plates 680 (only one being shown) keep the jaws 662, 663 and 676, 677 in place. The anchor wires are straightened by the fingers 681 which strike the said wires as the slide 664 is raised. These fingers are located on the springs 682 in the wells of arms 683 in which they are held by the plate 684.

The mounting operation now being completed, the transfer jaws release the filament and return for another filament, and the platform 605 is lowered so as to withdraw the dies 643 and at the same time lower the clamping device away from the lower ends of the leads. The upper platform 604 is next raised thereby withdrawing the bending and clamping plates 616, 617, 618 and 619, thus releasing the anchor support wires held between them. Finally the bracket 601 is rotated out of the path of the stem which is indexed on to position 12.

Position 12 is unoccupied but the following position, 13, is occupied by the final leading-in wire hook clamping and support wire positioning mechanism shown in Figs. 35 and 36. This mechanism is operated through rod 700 (Fig. 7) which in turn is operated by cam 701 acting through lever 702. The connection between rod 700 and lever 702 is made through joint block 703 and lever 702 is operated about pin 704 by a roller (not shown) which rides in the ways of cam 701. With the upward movement of rod 700 the jaws 705 and 706 will raise to a position adjacent the hooks in the leading-in wires and the slides 707 and 708 are advanced toward their respective anchors. This action occurs as the downward pull of rod 700 no longer counteracts the efforts of spring 709 (Fig. 36) located below plunger 710 in a well in standard 711. The action of plunger 710 pushing against projection 712 of slide 713 moves said slide upwards thus carrying upwards jaws 705 and 706 which are hereto attached by the pins 714 and 715 and stationary jaw 716 which is a part of the slide. The slides 707 and 708 will also be moved outward their maximum distance which bends the first and third support wires as shown in Fig. 37. This motion occurs as rollers 717 and 718 upon pins 719 and 720 respectively in the slides are forced to follow the opening in cam plates 721 and 722 which are fastened to the slide. The limit of the slide's motion is governed by the hitting of projection 712 against stop 723 attached to the standard. The continued upward movement of rod 700 raises joint block 724 and yoke 725 and forces the lower end of jaws open through the aid of links 726, 727 and 728. Links 726 and 727 are attached to jaw 705 by pin 729, and link 728 is attached to jaw 706 by pin 730 while all three links are attached to the yoke 725 by pin 731. Vertical motion of yoke 725 is assured by roller 732 which rides in recess 733 in the standard. As the jaws close they squeeze the hooks in the leading-in wires between the inserts 734, 735 and 736, as shown in Fig. 37. The complete operation of this mechanism is now completed and in the return movement of rod 700, the jaws will be opened until their ends strike the heads of bolts 738 and 739 and then the slide will be lowered to the position shown.

The stem indexed from position 13 passes through positions 14, 15, 16 and 17 before it is again operated upon. At position 18 the stem is removed from the mounting machine head by the unloading conveyor which consists of a chain 740 on which holders 741 are mounted. The finished stem or mount, which it is now called, is carried by the holders 741 by the flared out portion of the stem tube 10.

What I claim as new and desire to secure by Letters Patent of the United States, is:

1. A machine for making mounts for electric incandescent lamps and similar devices comprising a carrier having a plurality of stem holders each comprising a stem gripping means and a stem transferring means comprising a movable slide and a member comprising a pair of jaws supported thereon and mechanism for causing said gripping means and jaws to open and close and said slide to be moved back and forth from said carrier in proper time relation.

2. A machine for making mounts for electric incandescent lamps and similar devices comprising a carrier having a plurality of stem holders each comprising a stem gripping means and a stem transferring means comprising a movable slide, an adjustably supported channel for said slide, and a member comprising a pair of jaws supported thereon, and mechanism for causing said gripping means and jaws to open and close and said slide to be moved back and forth from said carrier in proper time relation.

3. In a machine for making mounts for electric incandescent lamps and similar devices, the combination of a movable carrier having a plurality of stem holders, means for moving said carrier intermittently and a lead-wire trimming and flattening mechanism disposed adjacent to the path of travel of said holders comprising means for moving the wires into alignment therewith and coacting flattening blocks and blades positioned adjacent said blocks and adapted to engage one of said blocks to cut said wire and means for actuating them in proper time relation with the movements of said carrier.

4. In a machine for making mounts for electric incandescent lamps and similar devices, the combination of a movable carrier having a plurality of stem holders, means for moving said carrier intermittently and lead wire trimming mechanism disposed adjacent to the path of travel of said holders comprising coacting blocks and blades, said blades being mounted adjacent said blocks and mechanism whereby said blades are actuated in proper time relation with the movements of said carrier.

5. In a machine of the character described, the combination of a movable carrier having a plurality of stem holders, means for intermittently moving said carrier and a lead-wire positioning mechanism disposed adjacent to the path of travel of said holders and comprising a set of jaws mounted to grip a lead wire near the sealed-in portion thereof, another set of jaws mounted to grip said lead-wire at an end thereof, means for causing said pair of jaws to be separated to stretch said wire and means whereby said parts are caused to operate in proper time relation with the movements of said carrier.

6. In a machine of the character described, the combination of a movable carrier having a plurality of stem holders, means for intermittently moving said carrier and a lead-wire positioning mechanism disposed adjacent to the path of travel of said holders and comprising a set of jaws mounted to grip a plurality of said lead-wires near the sealed-in portions thereof, another set of jaws mounted to grip a plurality of said lead-wires at ends thereof, means for causing said pairs of jaws to be separated to stretch said wires and means whereby said parts are caused to operate in proper time relation with the movements of said carrier.

7. In a machine of the character described, the combination of a movable carrier having a plurality of stem holders, means for moving said carrier intermittently, mechanism disposed adjacent the path of travel of said holders for mounting a filament on each stem, means for feeding filaments to said mounting mechanism comprising a plurality of spaced plates substantially horizontally disposed, a member carrying a plurality of pairs of pegs adapted to be projected through the spaces between said plates and means for reciprocating, raising and lowering said member and means whereby said parts are caused to operate in proper time relation with the movement of said carrier.

8. In a machine of the character described, the combination of a movable carrier having a plurality of stem holders, means for moving said carrier intermittently, mechanism disposed adjacent the path of travel of said holders for mounting a filament on each stem, means for feeding filaments to said mounting mechanism comprising a plurality of spaced plates substantially horizontally disposed, a member carrying a plurality of pairs of pegs adapted to be projected through the spaces between said plates, a sliding gate upon which said filaments are delivered, means for sliding said gate, and means for reciprocating, raising and lowering said member and means whereby said parts are caused to operate in proper time relation with the movement of said carrier.

9. In a machine of the character described, a filament mounting mechanism comprising a slide upon which said filament is received, a die carried by said slide, a movable sub-slide also carried by said slide and having a slot therein and a block thereon, means for moving said sub-slide to cause said block to force said filament against said die and to cause said filament to enter said slot, means for subsequently advancing said slide and means for then causing said die to be retracted.

10. In a machine of the class described, the combination of means for causing a filament to assume a definite shape comprising a slide upon which said filament rests with its ends protruding and means for positioning said ends comprising sets of fingers between which said filament is held and means for advancing said slide and causing the opening and closing of said fingers about said filament ends in proper time relation with the movement of said slide.

11. In a machine of the class described, a filament mounting mechanism comprising means for supporting a filament and positioning its ends and a transferring mechanism comprising a carriage having two pairs of jaws, means for opening and closing jaws about said filament ends, means for moving said pairs of jaws relatively to each other and means for swinging said pairs of jaws and moving said carriage to place said filament in mounting position.

12. In a machine of the class described, the combination of a plurality of sets of jaws each set being adapted to clamp an intermediate portion of an anchor, curling dies disposed below said jaws, means for causing said dies to engage the free ends of said anchors and to curl them into closed loops, movable fingers mounted to allow them to be lowered into and raised out of engagement with said filament and means for allowing the said fingers to drop upon said filament when said anchors are partially curled thereabout.

13. In a machine of the class described, a chain carrier comprising a plurality of links, having rollers for guiding and rollers for supporting said chain through engagement with a track and stem holders carried by said links comprising a plurality of pairs of jaws, one pair positioned to engage a stem arbor and another pair positioned to engage another portion of said stem.

14. In a machine of the class described, the combination of mechanisms arranged in series for trimming and positioning leading-in wires, for mounting a filament by curling anchors therearound and for clamping the ends of said leading-in wires about the ends of said filament with an endless chain carrier having a plurality of stem holders and means for intermittently moving said carrier to cause the stems carried by said holders to be successively acted upon by said mechanisms.

In witness whereof, I have hereunto set my hand this 29th day of September, 1930.

JOHN FLAWS, Jr.